Jan. 27, 1959   R. H. PEASE   2,870,876
TRAILER BRAKE CONTROL SYSTEM
Filed May 6, 1957

INVENTOR.
Robert H. Pease
BY
ATTORNEY

United States Patent Office 2,870,876
Patented Jan. 27, 1959

2,870,876

TRAILER BRAKE CONTROL SYSTEM

Robert H. Pease, Oklahoma City, Okla.

Application May 6, 1957, Serial No. 657,101

4 Claims. (Cl. 188—139)

This invention relates to improvements in brake systems for trailers and the like, and more particularly, but not by way of limitation, to an improved control system for the brakes of a trailer or the like.

As it is well known in the art, it is highly desirable that trailers be provided with brakes which may be actuated substantially simultaneously with actuation of the brakes on the towing vehicle. Otherwise, the trailer will tend to overrun the towing vehicle when the towing vehicle is decelerated to impose a threat to the control of the towing vehicle. Many attempts have been made to provide a suitable control system for trailer brakes, but none of the control systems heretofore devised have been widely accepted. Many of the control systems utilize electrical energy which is controlled manually by the driver of the towing vehicle. Such a system is acceptable to a degree, after the driver of the towing vehicle has had substantial experience, but in most situations such conditions do not prevail. Most of the control systems have been devised for incorporation in the tongue assembly, or hitch, of the trailer to the towing vehicle, whereby the trailer brakes are actuated upon forward movement of the trailer with respect to the towing vehicle. The last-mentioned systems are ordinarily exposed to the weather; are ordinarily intricately made, to require frequent repair or replacement; either make unsatisfactory, or no provision, for releasing the trailer brakes when it is desired to back the trailer, and provide no control of the trailer brakes until at least a portion of the inertia of the trailer is translated to the towing vehicle, whereby the towing vehicle is subjected to substantial jerks.

The present invention contemplates a novel trailer brake control system requiring no connection of the trailer to a towing vehicle, except for the usual hitching of the trailer. The present control system relies upon the inertia of a mass suitably supported in the trailer for movement fore and aft in the trailer upon deceleration and upon conclusion of deceleration, or acceleration of the trailer. The moving mass is connected by a lever system to the master cylinder of a hydraulic brake system for the trailer, and the entire control system may be easily installed in a protected location in the trailer, free from effects of the weather. The present invention also contemplates means for biasing the mass forwardly in such a manner that the trailer brakes will be actuated upon a relatively slight deceleration of the trailer, yet a reasonably sized mass may be used, and the trailer brakes will be released as soon as the brakes of the towing vehicle are released, or an external force is applied for moving the trailer forwardly.

An important object of this invention is to provide a control system for trailer brakes, whereby the trailer brakes will be automatically applied and released substantially simultaneously with the brakes of a towing vehicle.

Another object of this invention is to maintain the work and attention required by the driver of a towing vehicle at a minimum.

A further object of the invention is to provide a control system for trailer brakes which may be conveniently located in a protected position in the trailer, inaccessible to weather conditions.

A still further object of this invention is to provide a control system for trailer brakes which is simple in construction and may be economically manufactured.

Other objects and advantages of the invention will be evident from the following detailed description, when read in conjunction with the accompanying drawings which illustrate my invention.

Figure 1:
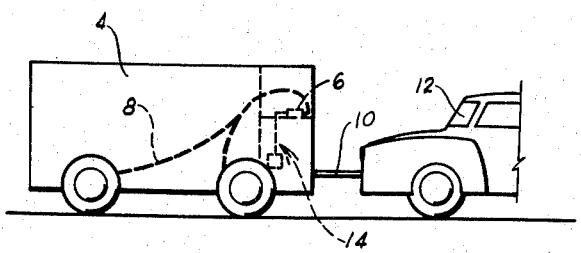
Figure 1 is a schematic side elevational view of a trailer and a portion of a towing vehicle, wherein the trailer utilizes the present control system.

Referring to the drawings in detail, and particularly Fig. 1, reference character 4 designates a typical trailer having what is commonly known as a conventional hydraulic brake system comprising a master cylinder 6 and lead lines 8 extending to at least two wheel brake assemblies of the trailer. The trailer 4 is connected by a suitable tongue and hitch 10 to a towing vehicle, partially shown at 12. The present control system, generally designated by reference character 14, is positioned in the trailer 4 for operating the master cylinder 6 and the remainder of the brake system of the trailer upon deceleration or acceleration of the trailer 4, as will be more fully hereinafter set forth.

In one embodiment of the present invention, the master cylinder 6 (see Fig. 2) is suitably bolted to a horizontal support plate 16 secured between forward and rear vertical partitions 18 and 20 respectively, of the trailer 4. A suitable clevis 22 is formed or secured on the outer end of the piston rod 24 of the master cylinder 6 to receive one end 26 (see also Fig. 3) of a horizontally extending lever 28. A pin 29 pivotally secures the lever 28 to the clevis 22. The lever 28 is also pivotally secured to the support plate 16 by means of a vertically extending shaft or pin 30. A tension spring 32 is suitably anchored between the opposite end 34 of the lever 28 and the forward vertical partition 18 of the trailer. The tension spring 32 is primarily utilized to assist the usual return spring (not shown) in the master cylinder 6 in returning the piston rod 24 to a retracted position and to take up any wear which may occur between the lever 28, shaft 30, pin 29 and clevis 22.

Figure 3:
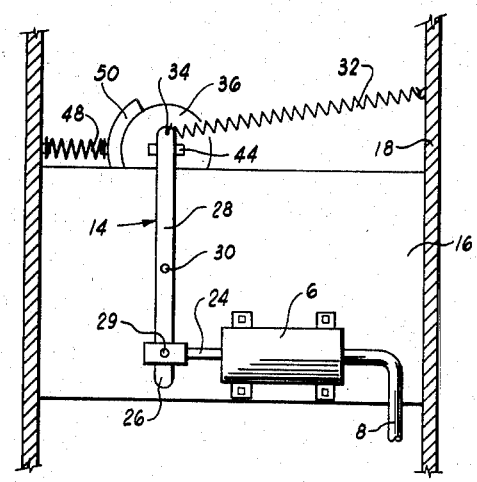
Figure 3 is a plan view of the control system illustrated in Fig. 2.

A mass 36 is rigidly secured on the lower end of a vertically extending support rod 38, with the mass 36 being positioned between the partitions 18 and 20. If desired, the mass 36 may be threadedly secured on the rod 38 for vertical adjustment of the mass. The mass 36 and rod 38 are pivotally supported by means of pin or shaft 40 extending transversely through the rod 38 and a suitable bracket 42 depending from the support plate 16. It will be observed that the shaft 40 extends transversely with respect to the trailer 4, whereby the mass 36 may swing fore and aft in the trailer. As best shown in Fig. 3, the upper end 44 of the rod 38 is bifurcated to extend on opposite sides of the horizontal lever 28 adjacent the end 34 thereof. Thus, the rod 38 is pivotally connected to the end 34 of the lever 28 to pivot the lever 28 upon swinging movement of the mass 36.

Another tension spring 46 is anchored between the support rod 38, below the supporting pin 40, and the forward partition 18. The spring 46 has a strength sufficient to urge the mass 36 forwardly in the trailer, yet is of insufficient strength to move the mass forwardly from its neutral position without the application of additional force. Thus, the spring 46 merely biases the mass 36 forwardly. As will be apparent, the mass 36 will tend to depend from the supporting shaft 40 in such a position that the mass will be directly below the shaft. A compression spring 48 is anchored to the rear partition 20 in line with the mass 36 and has a suitable strap or yoke 50 on the outer end thereof of a size to contact the mass 36 when the mass moves rearwardly beyond a position directly below the supporting shaft 40. It is to be specifically noted that neither the spring 48 nor strap 50 is connected to the mass 36. The spring 48 is of a strength to cushion the rearward movement of the mass 36 and prevent the mass from moving appreciably behind or beyond a position directly below the supporting shaft 40.

*Operation*

Figure 2:
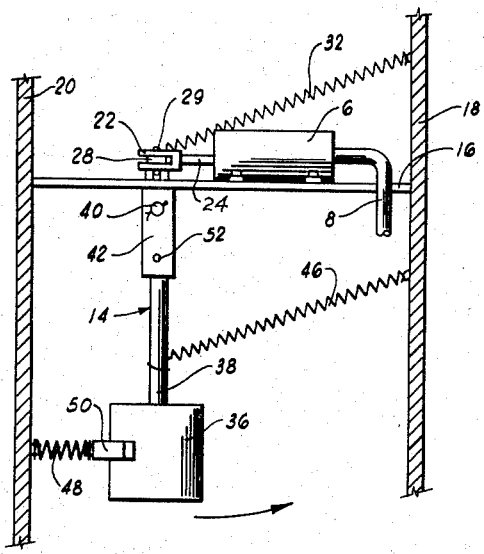
Figure 2 is a side elevational view of one embodiment of the present invention.

When the trailer 4 is being towed at a substantially constant speed, the mass 36 will be positioned in a neutral or inoperative position directly below the supporting shaft 40 as illustrated in Fig. 2. Upon the application of the brakes in the towing vehicle 12, the trailer 4 will be decelerated, thereby imposing an inertia force on the mass 36. This inertia force, in combination with the action of the tension spring 46, will swing the mass 36 forwardly in the trailer 4 as indicated by the arrow in Fig. 2. Such movement of the mass 36 is transmitted through the rod 38, and lever 28 to the piston rod 24 of the master cylinder 6 to apply the trailer brakes. It will also be observed that the forward movement of the mass 36 is against the action of the upper tension spring 32. However, the spring 46 is substantially stronger than the spring 32 and is connected to the rod 38 at a greater distance from the shaft 40 than the spring 32; therefore, the spring 46 will adequately overcome the spring 32 for a forward movement of the mass 36 upon deceleration of the trailer 4.

When the deceleration of the trailer 4 is ended, as by the towing vehicle 12 being speeded up; both the trailer 4 and towing vehicle 12 coming to a complete stop, or the brakes of the towing vehicle being merely released during forward movement of the trailer and the vehicle, the mass 36 tends to swing back rearwardly to a position directly below the supporting shaft 40. In the event the mass 36 is moved rearwardly at a substantial speed, the mass contacts the yoke 50 and slightly compresses the spring 48, whereby the movement of the mass 36 is retarded or snubbed, to prevent a substantial movement of the mass 36 beyond a position directly below the shaft 40.

With proper design of the control system 14, particularly the weight of the mass 36 and strength and location of the spring 46, the trailer will be slowed down and stopped substantially simultaneously with the towing vehicle 12. Also, the brake system of the trailer 4 may be released substantially simultaneously with the release of the brakes of the towing vehicle 12 (after the towing vehicle is merely slowed down) to such a degree of precision that the driver of the vehicle 12 will not be able to detect any jerking caused by operation of the trailer brakes.

As an illustration of the present invention, I have used the system described herein in a fourwheel trailer weighing 2,180 pounds having hydraulic brakes on all wheels, with the trailer being pulled by an automobile weighing 3,180 pounds. In this embodiment, the mass 36 and shaft 38 weighed forty-two pounds and the tension of the spring 46 was twelve pounds. The center of gravity of the mass 36 was 20½ inches below the supporting shaft 40, and the spring 46 was connected to the rod 38 six inches below the supporting shaft. Other dimensions were that the rod 38 extended 2½ inches above the supporting shaft 40, and the lever 28 was supported such that the end 34 of the lever 28 was 6¾ inches from the pin 30 and the pin 29 was three inches from the pin 30. Also, the tension of the spring 32 was three pounds. With this design, the trailer brakes are applied substantially simultaneously with the application of the towing vehicle brakes, as well as being released substantially simultaneously with the towing vehicle brakes. In testing the system with the design described, the towing vehicle was driven at about fifty miles per hour and slowed down suddenly in such a manner that the wheels of the towing vehicle were skidded about twenty feet. An examination of all vehicle skid marks showed that the skid marks of the towing vehicle were only eighteen inches longer than the skid marks of the trailer, thereby indicating that the trailer brakes were operating almost simultaneously with the brakes of the towing vehicle. Furthermore, the design described is very satisfactory when the trailer is loaded with 2,600 pounds.

Another advantage of the present invention is that the trailer 4 can be backed-up without the brakes of the trailer being applied. It will be observed that the mass 36 will be retained in a position substantially directly below the shaft 40 when the trailer 4 is either stopped or is being backed-up. The compression spring 48 and strap 50 will prevent any movement of the mass 36 when the trailer 4 is stopped at the end of a backing operation.

In the event it is desired to operate the trailer 4 without the use of the trailer brakes, a suitable pin (not shown) may be inserted through complimentary apertures 52 extending through bracket 42 and the rod 38. The cooperation of the shaft 40 and pin extending through the apertures 52 will retain the mass 36 in a position directly below the shaft 40 during all movements of the trailer 4.

From the foregoing it will be apparent that the present invention provides a control system for trailer brakes wherein the trailer brakes will be operated substantially simultaneously with the brakes of the towing vehicle, automatically, and without any additional effort or movements on the part of the driver of the towing vehicle. The present control system requires no connection between the trailer and the towing vehicle, except the conventional tongue and hitch connection and the structural elements of the control system may be conveniently located in a protected location in the trailer, inaccessible to weather conditions. The control system relies upon the action of inertia of a mass freely movable in the trailer, wherein the mass is biased in a direction to apply the brakes of the trailer. The biasing spring for the mass permits the use of a practical sized mass, yet does not interfere with release of the trailer brakes when the speed of the towing vehicle is again uniform. It will also be apparent that the present control system is simple in construction and may be economically manufactured.

Changes may be made in the combination and arrangement of parts or elements shown in the drawings and described in the specification, it being understood that changes may be made in the precise embodiment shown without departing from the spirit and scope of the invention as defined in the following claims.

I claim:

1. A brake control system for a trailer having hydraulic brakes, comprising a mass pivotally suspended in the trailer for swinging movement fore and aft in the trailer with deceleration and acceleration of the trailer, a system of levers connecting the mass to the master cylinder piston of the trailer hydraulic brakes in a manner to actuate said brakes upon forward movement of the mass and release said brakes upon rearward movement of the mass, a spring biasing the mass forwardly in the trailer, and a resilient buffer secured behind said mass for limiting the rearward movement of said mass to a position substantially directly below the pivot point of said mass.

2. A brake control system for a trailer having hydraulic brakes, comprising a mass, a rod extending upwardly from said mass and pivotally secured intermediate its length in the trailer on an axis transverse to the direction of travel of the trailer for a swinging movement of said mass upon acceleration and deceleration of the trailer, a horizontally extending lever pivotally connected at one end to the upper end of said rod and pivotally supported in the trailer at a point intermediate the ends of the lever, the opposite end of said lever being pivotally secured to the master cylinder piston of the trailer hydraulic brake system for actuating the trailer brakes upon a forward swinging movement of said mass, and a spring anchored between said mass and the trailer, said spring being of a strength only to bias said mass forwardly.

3. A system as defined in claim 2 characterized further in that a spring is anchored between the trailer and the first-mentioned end of said lever urging said lever in a direction to release the brake system, said spring having a strength less than the first-mentioned spring.

4. A system as defined in claim 2 characterized further in that a compression spring is anchored in the trailer in a position to contact said mass during rearward movement of said mass and stop said mass when substantially directly below the pivot point thereof, a bracket is secured in the trailer adjacent said rod, and said bracket and rod have complementary apertures to receive a lock pin and lock said mass in an inoperative position.

References Cited in the file of this patent

UNITED STATES PATENTS

| | | |
|---|---|---|
| 1,707,974 | Christensen | Apr. 9, 1929 |
| 1,775,872 | Smith | Sept. 16, 1930 |
| 2,152,017 | Banning | Mar. 28, 1939 |
| 2,807,337 | Starling | Sept. 24, 1957 |